United States Patent Office 3,222,384
Patented Dec. 7, 1965

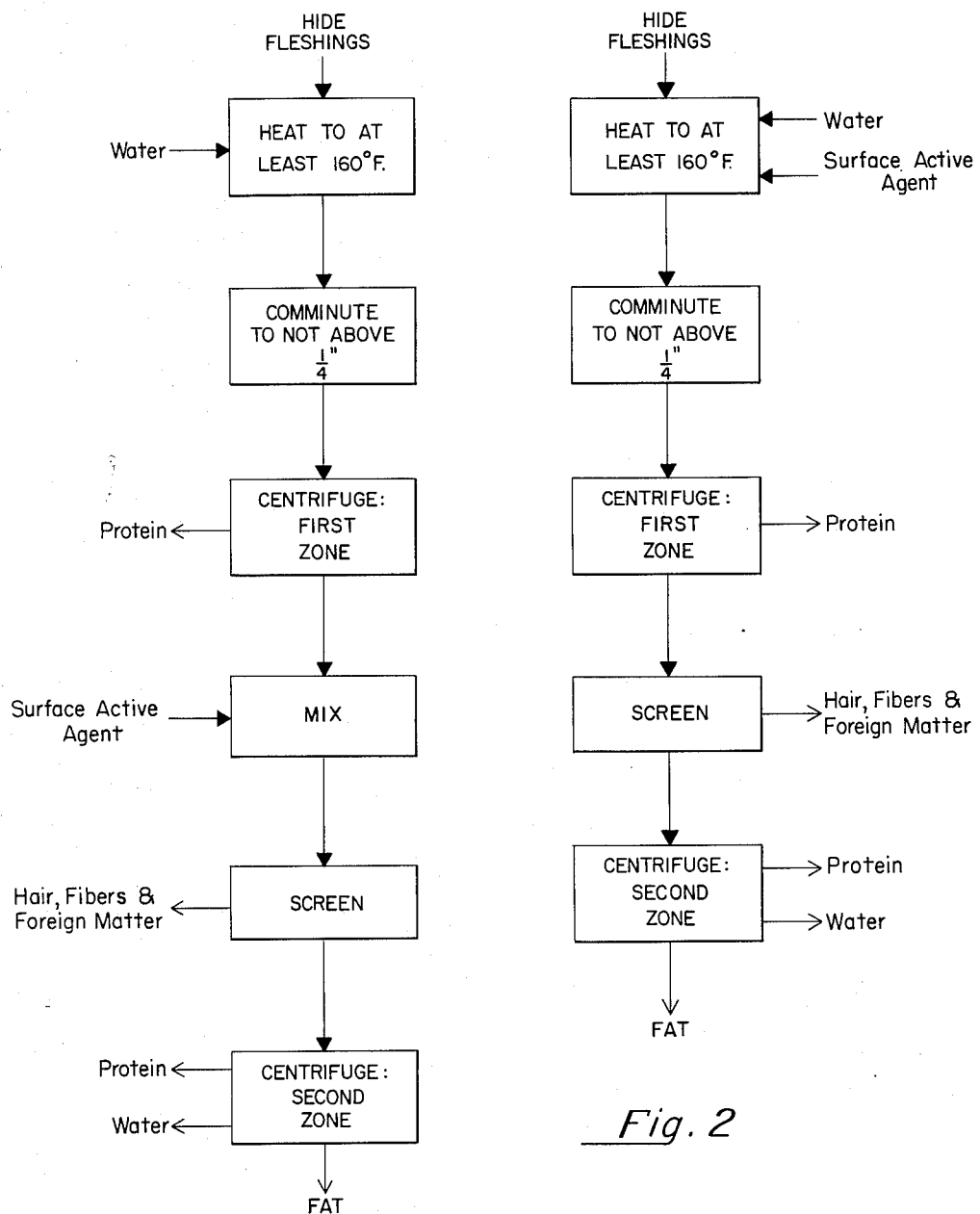

3,222,384
PROCESS FOR RENDERING ANIMAL FAT
Marvin E. Blumberg, Havertown, and Gerald J. Gould, Bristol, Pa., assignors to Pennsalt Chemicals Corporation, a corporation of Pennsylvania
Filed Dec. 31, 1962, Ser. No. 248,792
1 Claim. (Cl. 260—412.6)

This invention relates to a process for rendering animal fat and recovering partially defatted tissue comprising protein solids. More specifically the invention relates to a process for rendering raw animal fat stock and separating the melted fat from the fatty tissue in the presence of a surface active agent to facilitate separation.

Still more specifically the invention relates to the processing of hide fleshings to render fat therein and separate the melted fat from fatty tissue in the presence of a surface active agent containing a compound which is the reaction product of a mercaptan and ethylene or propylene oxide.

In the prior art it is well known to render animal fat tissue by elevating it to temperatures above the melting point of the fats present and subjecting the mass to a zone of centrifugation to divide the mass into primarily liquid portion including liquid fat and a primarily solid portion including protein solids. The primarily liquid portion may be further treated in a second zone of centrifugation to remove remaining solids. An example of such processing may be found in the U.S. Patent 2,823,-215 which issued February 11, 1958, on an application by Francis P. Downing.

With particular animal fat feed stock to the Downing process and comparable processes extreme difficulty has been experienced especially in the second zone of centrifugation in that a stubborn emulsion apparently stabilized by solids with entrained fat may not be broken even under a high centrifugal force. Such stubborn emulsion has made the clarification of the melted fat virtually impossible and therefore deprived the process of valuable separated protein and fat yields. This difficulty has been especially noticeable in the processing of hide fleshings.

Hide fleshings are solids scraped from the inside of hides usually preparatory to a leather tanning or conditioning process. Formerly the fleshings which contain tough stringy fibers have been removed from hides or strips of hides by the tanner and have been boiled for long periods of time to liquify most solids and to produce a substance usable as glue. Some low grade fat may have been skimmed off in the process. The value of the products of past fleshings processing has usually been extremely low, even to the extent that some tanners have regarded fleshings as a worthless by-product not economically practical to further process and only presenting a serious waste-disposal problem.

It has for many many years been the hope of tanners and other processors that there may be developed a practical treatment for fleshings by which the fleshings may be treated to produce products of significant value and by which the waste-disposal problem may be eliminated. In this connection the development of an efficient centrifugal process for the production of valuable protein solids and a quality fat in high yield from ordinary fat scraps presented a possibility. Application of such a process to the treatment of fleshings was a disappointment, however, for the chemical or physical nature of fat tissue of fleshings was found to promote a stabilized emulsion which could not be broken even by application of laboratory magnitudes of centrifugal force. For this reason treatment in accordance with the Downing process and similar processes resulted in useable yields of such low level that former hide fleshings treatment was reverted to, namely, either the boiling of the fleshings for long periods of time to produce glue and some low grade fat or, more commonly, outright disposal.

The present disclosure will enable one skilled in the art to practice a separation process, preferably centrifugal, on ordinary hide fleshings and other animal stock which has previously been regarded as virtually worthless. The disclosure presents an improved process for the treatment of stock such as hide fleshings whereby the production of valuable protein solids and quality fat in high yield is possible.

Further objects of the invention and features thereof will be understood from the following description and with reference to the drawings in which:

FIGURE 1 is a flow diagram schematically illustrating a preferred form of process embodying the invention; and FIGURE 2 illustrates a modified form of process embodying the invention.

Briefly, in a process for rendering animal fat tissue including the step of comminuting tissue and separating the tissue from melted fat at an elevated temperature, the invention is the improvement which comprises making at least one separation of the fat from the tissue in the presence of at least one compound having the formula:

$$R-S-R'-O(R'-O)_nH$$

wherein R represents an alkyl radical and contains from 8 to 24 carbon atoms, wherein R' is selected from the group consisting of ethylene and propylene radicals, and wherein $n$ represents a whole number.

Referring more specifically to FIGURE 1 which is a flow diagram of a preferred process embodying the invention, animal fat stock which may be in the form of hide fleshings, that is low-protein-content fat scraped from the inside of animal skins, is delivered in convenient size to a fat pre-heater.

The preheater may be in the form of an open tank having a steam jacket, and the steam may be either under vacuum, at atmospheric pressure, or at some elevated pressure. To the preheater, along with the stock, is delivered a volume of fresh water which serves at least a two-fold purpose. First, water serves to soften tough stringy solids, especially noticeable if the stock is in the form of hide fleshings. This softening greatly facilitates subsequent comminution. Secondly, the addition of water in the desired ratio by weight to the weight of the feed stock serves to disperse the subsequently added surface active agent so that it may effectively act on all of the solid particles. For instance, when the surface active agent selected for use is a substance sold under the trademark "Nonic 218" as hereafter indicated, it has been found that the quantity of water delivered to the process with the fleshings should have the weight of about twice the weight of the feed stock and the weight of the "Nonic 218" used should be about 1% of the weight of the feed stock. It should be understood that all of the water need not be added in this initial step, some may be added after the comminution.

The feed stock and water in the preheater is heated to a temperature at least 160° F., preferably in the range between 180° and 210° F. If the stock is in small pieces, however, some of the benefits of the invention may obtain at temperatures anywhere above 140° F. In any case, to assure thermal equilibrium, the contents of the heater may be gently agitated as by a paddle-type rotating stirrer.

After the feed stock has been brought up to the desired temperature it is drained or pumped from the preheater continuously to a comminution operation. In practice comminution may be accomplished in two progressive steps. For instance, because of the toughness of the stock an initial comminution may be accomplished by a grinder or prebreaker having plate openings which may range from ½" to 1" in size followed by a second comminutor which may be a disintegrator type having rotating blades to which the material is delivered axially, disintegrating and forcing the mass through a concentric screen having openings of not in excess of ⅜" and preferably ¼" or less.

The mass having been reduced in particle size by the comminution operation is next continuously delivered to a first centrifugation zone which in the preferred form is a centrifuge having a hollow rotor with an axial screw rotating at a different speed from the rotor and adapted to scroll solids inward of the rotor to discharge. A suitable centrifuge for this purpose is, for instance, as shown in U.S. Patent 2,679,974 which issued June 1, 1954, on an application by Fred P. Gooch. This centrifuge separates its feed into a heavy discharge comprising protein solids with some water and as a light discharge an emulsion having low viscosity comprising melted fat, some remaining small solids and moisture.

The latter light discharge is next delivered to a container into which is also delivered a quantity of surface active agent. In the container or mixing tank which is preferably gently agitated by a rotary stirrer, the centrifuge light discharge and surface active agent may be raised in temperature if necessary to maintain the initial temperature level, that is at least 160° F. The quantity of surface active agent added at this point will depend on its strength and on the amount of water delivered initially to the preheater. If the surface active agent selected is "Nonic 218" which is normally about 95% concentration of surface active agent of a chemical nature to be described, and if twice the feed stock weight in water has been delivered to the process, the amount of "Nonic 218" should be roughly 1% by weight of the feed stock.

After the centrifuge light discharge is thoroughly mixed with the surface active agent it is fed in a continuous stream through a screen or screens to remove hair, fibers and other unwanted matter and to a second centrifugation zone which in the preferred form may be a solid bowl centrifuge having peripheral openings adapted to periodically evacuate solids. Such a centrifuge may be of the type in which the bow shell is in two parts which are adapted periodically to be moved axially relative to each other to permit passage of solids through an annular or interrupted annular between the parts. A centrifuge of this type is presented in Patent 2,087,727 which issued July 20, 1937, on an application filed by Wilmer H. Bath. Alternately such a centrifuge may be the type described in the Patents 2,286,354 and 2,286,355 which issued on June 16, 1942, on applications filed by Harold C. Fitzsimmons.

From the second centrifugation zone there will be three discharges; namely, the solids or protein product which may be combined with the protein product from the first zone of centrifugation if the presence of surface active agent in small quantities can be tolerated; the melted fat product; and water. The melted fat product constitutes a fat of low titer and high quality suitable for commercial use. The water discharge from the second zone is normally clean enough to be led directly to a municipal sewer.

Now referring to FIGURE 2, a modified process embodying the invention is illustrated. The process is fundamentally similar to that represented in FIGURE 1 except that the surface active agent, such as "Nonic 218," is delivered to the process at the preheating tank and is dispersed through the mass in the preheater to facilitate not only the separation in the second centrifugation zone, but also in the first centrifugation zone. The benefit of the modified form of process shown in FIGURE 2, for instance, is that a greater percentage of solids of the original feed will be discharged from the first centrifugation zone as heavy discharge with a consequent lessening of the quantity of solids delivered to the second centrifugation zone. Further, because of the early presence of the surface active agent in the process the heavy discharge protein product from the first centrifugation zone contains appreciably less fat.

As the surface active agent referred to in the above descriptions considerable experimentation has revealed that most agents are not successful. However, functioning admirably are compounds selected from a group of compounds having the formula:

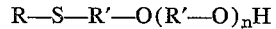

wherein R represents an alkyl radical and contains from 8 to 24 carbon atoms, wherein R' is selected from the group consisting of ethylene and propylene radicals and wherein $n$ represents a whole number. Such compounds are the subject matter of Patent 2,565,986 granted August 28, 1950, on an application by John F. Olin.

More preferably in the above representation R may contain 8 to 16 carbon atoms, or better still 11 to 13 carbon atoms. While the alkyl group may be attached to S through any carbon atom, preferably it is attached to the sulfur atom through a secondary or tertiary carbon atom. The secondary or tertiary alkyl radical is preferably one derived from a polyolefin. Where R' is an ethylene radical, $n$ more preferably represents from 4 to 20, or better still 6 to 14, or even better still 8 to 12. Wherein R' is a propylene radical, $n$ more preferably represents from 4 to 10, or better still 5 to 8.

The most preferred form of compound for use in the process of the invention is the compound represented by the above condensed formula wherein R contains 12 carbon atoms and is connected to the sulfur atom through a tertiary carbon atom; wherein R' is an ethylene radical; and wherein $n$ is 9.

Found to be outstanding in performance in the practice of the invention is a non-ionic surface active agent sold under the trademark "Nonic 218." This product is predominantly the most preferred agent as described in the preceding paragraph which is supplied at present in concentration of 94 to 96% under the indicated trademark.

Although R is a simple alkyl group it may contain minor constituents such as chloro- or nitro- and minor variations in structure do not alter significantly the hydrophobic character of the compound.

Where the agent is presented at the initial stage of the process as in FIGURE 2, the selection of type and concentration of surface active agent must be deliberately made, especially when the quality protein product from the first stage centrifugation is to be used as an animal feed. Some surface active agents have a cumulative toxic effect on animals. Obviously if the protein product is to be used for fertilizer, the toxicity of the agent is a consideration not so important. With respect to the amount of agent necessary, it has been found that for a given weight of fleshings less agent is needed in the FIGURE 1 embodiment than the FIGURE 2 embodiment.

The following examples meant by way of illustration and not by limitation show the benefits which may be achieved in accordance with the present invention.

*Example 1*

Into a preheater having a steam-jacketed wall was delivered 495 pounds of green, salted hide fleshings. To this charge was added twice the weight in water or about 970 pounds of water as well as 4.6 pounds of "Nonic 218." The entire charge was brought up to thermal equilibrium at 180° F. with the help of a slowly rotating paddle-type agitator.

After the charge arrived at the above temperature a continuous stream was delivered from the preheater to a Fitzmill comminutor designated D–6. The comminutor was fitted with a screen having ¼" openings through which the tissue discharged in particle size not above ¼″. Recirculation through the "Fitzmill" was effected to reduce the particle size further to dimensions not in excess of ⅛″.

Thus comminuted, the tissue and melted fat were delivered to first centrifugation zone comprising a "Super-D-Canter" centrifuge designated P–600. The bowl of the centrifuge rotated at 5000 r.p.m. while the inside scroll rotated at 50 r.p.m. slower to provide a scrolling action. From the "Super-D-Canter" centrifuge heavy discharge 113 pounds of solids flowed analyzing as follows:

80.5 pounds of water
22.5 pounds of solids
8.3 pounds of salt
1.7 pounds of melted fat The light discharge from the "Super-D-Canter" centrifuge comprised:

1142 pounds of water
5.6 pounds of solids
67 pounds of salt
76 pounds of melted fat The light discharge was fed through a strainer having a 60 mesh screen to remove hair, fibers and other foreign matter and was continuously delivered to a second centrifugation zone comprising a tubular centrifuge designated AS–16. This centrifuge which comprised the second zone of centrifugation had a bowl 38″ long and 4¼″ in diameter and rotated at a speed of approximately 11,000 r.p.m., sufficient to generate centrifugal force roughly 13,000 times the acceleration of gravity.

From the tubular centrifuge heavy discharge flowed comprising 1029 pounds of water and no fat for practical purposes. The light discharge was 76 pounds of fat and 0.3 pound of water, 0.1 pound insoluble solids. The fat analyzed at 1.6% unsaponifiables.

After the run the second centrifuge was opened and 16 pounds of insolubles were scraped from its walls. These solids analyzed at approximately 80% water.

The water discharge from the second stage was suitable for direct disposal into municipal sewers. High quality protein solids tissue from the first and second zones were combined, and the low titer fat of excellent color was found commercially acceptable. Especially noteworthy and characteristic of the process is the fact that the initial fleshings charged analyzed at 78 pounds fat and 76 pounds fat were recovered from the second centrifugation zone. This indicates the efficiency of the process.

*Example 2*

Into the preheater of Example 1 is delivered 500 pounds of green, salted hide fleshings. To this charge is added twice the weight in water or about 1000 pounds of water. The entire charge is brought up to thermal equilibrium at 180° F. with the help of a slowly rotating paddle-type agitator.

After reaching the temperature a continuous stream is delivered from the preheater to the comminutor of Example 1 whereby the solids are reduced to dimension not in excess of ⅛″. Thus comminuted, the tissue and melted fat are delivered to the "Super-D-Canter" centrifuge of Example 1 operating under the same conditions.

The heavy discharge from the "Super-D-Canter" centirfuge comprises:

253 pounds of water
5 pounds of solids
30 pounds of salt
29.5 pounds of melted fat The light discharge from the centrifuge comprises:
1025 pounds of water
5 pounds of solids
30 pounds of salt
63 pounds of melted fat The liquid effluent from the "Super-D-Canter" centrifuge is in the form of a low viscosity oily emulsion, chocolate brown in color with absolutely no evidence of separability of the oil, water and solids.

The liquid discharge emulsion with screening as in Example 1 is delivered to the tubular second centrifuge of Example 1 rotating at the same speed. There is no successful separation. The light discharge from this centrifuge is dirty and oily, while the heavy discharge is also dirty and contains a large percentage of oil-water-solids emulsion. The light discharge is not acceptable commercially because of its dirty condition. Further, the heavy phase being dirty and oily is not suitable for outright disposal into a municipal sewer.

Variations of the processes described are possible and still fall within the scope of the present invention. For instance, immediately succeeding the initial heating step there may be interposed a skimming step by which melted fat may be removed from the top of the preheater. This operation reduces the volume of fluid handled in the following steps. Further, an additional step may be added involving the settling by gravity of the liquid discharge from the first centrifugation zone and suitable drawing off of fat to reduce the load on the second centrifugation.

From the above description and examples the significance of the present invention will be readily understood. It achieves its object of separating fat from tissue in the situation where because of the chemical and physical properties of the feed a stabilized emulsion not breakable by centrifugation results. High yields and excellent qualities of discharged tissue and fat are benefits from the process of the invention.

Having particularly described our invention, it is to be understood that this is by way of illustration and that changes, omissions, additions, substitutions and/or other modifications may be made without departing from the spirit thereof. Accordingly, it is intended that the patent shall cover, by suitable expression in the claim, the various features of patentable novelty that reside in the invention.

We claim:

In a process for rendering animal hide fleshings including the steps of heating the fleshings to at least 160° F. in the presence of added water, comminuting the heated fleshings, centrifugally separating the heated fleshings into tissue and melted fat containing residual tissue, screening the residual tissue and the melted fat and then centrifugally separating the residual tissue from the melted fat, the improvement which comprises said screening and said separating the residual tissue from the melted fat in the presence of at least one compound having the formula:

$$R-S-R'-O(R'-O)_nH$$

serving as a surface active agent, wherein R represents a tertiary alkyl radical containing 12 carbon atoms, R' is an ethylene radical, and $n$ represents the number 9.

References Cited by the Examiner

UNITED STATES PATENTS

| | | | |
|---|---|---|---|
| 2,565,986 | 8/1951 | Olin | 260—609 |
| 2,663,717 | 12/1953 | Strezynski et al. | 260—412 |
| 2,776,278 | 1/1957 | Birds | 260—412 |
| 2,823,215 | 2/1958 | Downing | 260—412.6 |

FOREIGN PATENTS 559,175  2/1944  Great Britain.

CHARLES B. PARKER, *Primary Examiner.*
IRVING MARCUS, *Examiner.*